United States Patent
Ohtsuki et al.

(10) Patent No.: US 7,909,517 B2
(45) Date of Patent: Mar. 22, 2011

(54) WHEEL SUPPORT BEARING ASSEMBLY AND MANUFACTURING METHOD THEREOF

(75) Inventors: Hisashi Ohtsuki, Iwata (JP); Kikuo Maeda, Kuwana (JP)

(73) Assignee: NTN Corporation, Osaka (JP)

( * ) Notice: Subject to any disclaimer, the term of this patent is extended or adjusted under 35 U.S.C. 154(b) by 553 days.

(21) Appl. No.: 12/068,866

(22) Filed: Feb. 12, 2008

(65) Prior Publication Data

US 2009/0016662 A1   Jan. 15, 2009

(30) Foreign Application Priority Data

Feb. 23, 2007 (JP) ................................. 2007-043596
Feb. 23, 2007 (JP) ................................. 2007-043597

(51) Int. Cl.
*F16C 13/00* (2006.01)
*B21D 53/10* (2006.01)

(52) U.S. Cl. ..................................... 384/544; 29/898.06
(58) Field of Classification Search .................. 384/544, 384/589, 625; 29/898.06–898.066
See application file for complete search history.

(56) References Cited

U.S. PATENT DOCUMENTS

| 6,685,572 | B2 * | 2/2004 | Makino et al. ................. 464/182 |
| 6,955,475 | B2 * | 10/2005 | Tajima et al. .................. 384/544 |
| 2002/0068639 | A1 | 6/2002 | Tajima et al. |
| 2004/0252927 | A1 | 12/2004 | Hirai et al. |
| 2005/0141798 | A1 * | 6/2005 | Okasaka ......................... 384/544 |
| 2005/0141799 | A1 * | 6/2005 | Uyama et al. .................. 384/544 |
| 2007/0201783 | A1 * | 8/2007 | Hirai et al. ..................... 384/544 |

FOREIGN PATENT DOCUMENTS

| JP | 2002-087008 | 3/2002 |
| JP | 2005-003061 | 1/2005 |

* cited by examiner

*Primary Examiner* — Thomas R Hannon (57) ABSTRACT

A wheel support bearing assembly with a hub axle of enhanced strength and a durability under a rotational bending condition as well as weight reduction, and without changing a shape and a dimension of a wheel mounting flange nor deteriorating a surface runout, and a manufacturing method thereof. A surface hardness is set to 20 HRC or more and than 35 HRC or less by applying an air cooling or a thermal refinement after hot forging a raw material of the hub axle, and a shot peening treatment is applied to an inner diameter portion of the hub axle.

9 Claims, 6 Drawing Sheets

Prior Art

Fig. 5

Prior Art

Fig. 6

WHEEL SUPPORT BEARING ASSEMBLY AND MANUFACTURING METHOD THEREOF

CROSS REFERENCE TO RELATED APPLICATIONS

This application is based on and claims priority to Japanese applications No. 2007-43596 and No. 2007-43597, each filed Feb. 23, 2007, which are incorporated by reference in their entirety into this application.

FIELD OF THE INVENTION

The present invention relates to a wheel support bearing assembly rotatably supporting a wheel of a vehicle such as a motor vehicle with respect to a vehicle body, and a manufacturing method thereof, and more particularly to a wheel support bearing assembly which improves a strength and a durability of a hub axle under a rotational bending condition, and a manufacturing method thereof.

BACKGROUND OF THE INVENTION

A wheel support bearing assembly for a motor vehicle includes one for a driven wheel and another for a drive wheel, and various types of bearing assemblies are provided in correspondence to respective intended uses. For example, in a conventional wheel support bearing assembly for a drive wheel shown in FIG. 6, main structure includes an inner member 50 provided with a hub axle 51 and an inner race 52, double row of rolling elements 53 and 54, an outer member 55, and a constant velocity universal joint 56 for transmitting an engine power to the hub axle 51. In the bearing assembly for the drive wheel, the hub axle 51 supporting a wheel (not shown) and a brake rotor 57 employs a medium carbon steel for mechanical structure such as S53C in the light of an easiness of forging, a cutting performance, a thermal refinement characteristic or an economical efficiency. Since achieving a reduction in size and weight of the wheel support bearing assembly of this kind including the hub axle 51 contributes greatly to an improvement of a fuel consumption and a traveling stability of the motor vehicle, it has been progressed to form a wheel mounting flange 58 of the hub axle 51 by a rib structure or to make the flange 58 thinner. On the other hand, with improvement in performance of the motor vehicle a load applied to the bearing assembly has been increased. However, a mechanical strength of the hub axle 51 itself comes close to a fatigue limit of the medium carbon steel or a raw material, and it is hard to achieve a further reduction in size and weight and a further improvement of a durability.

Figure 6:
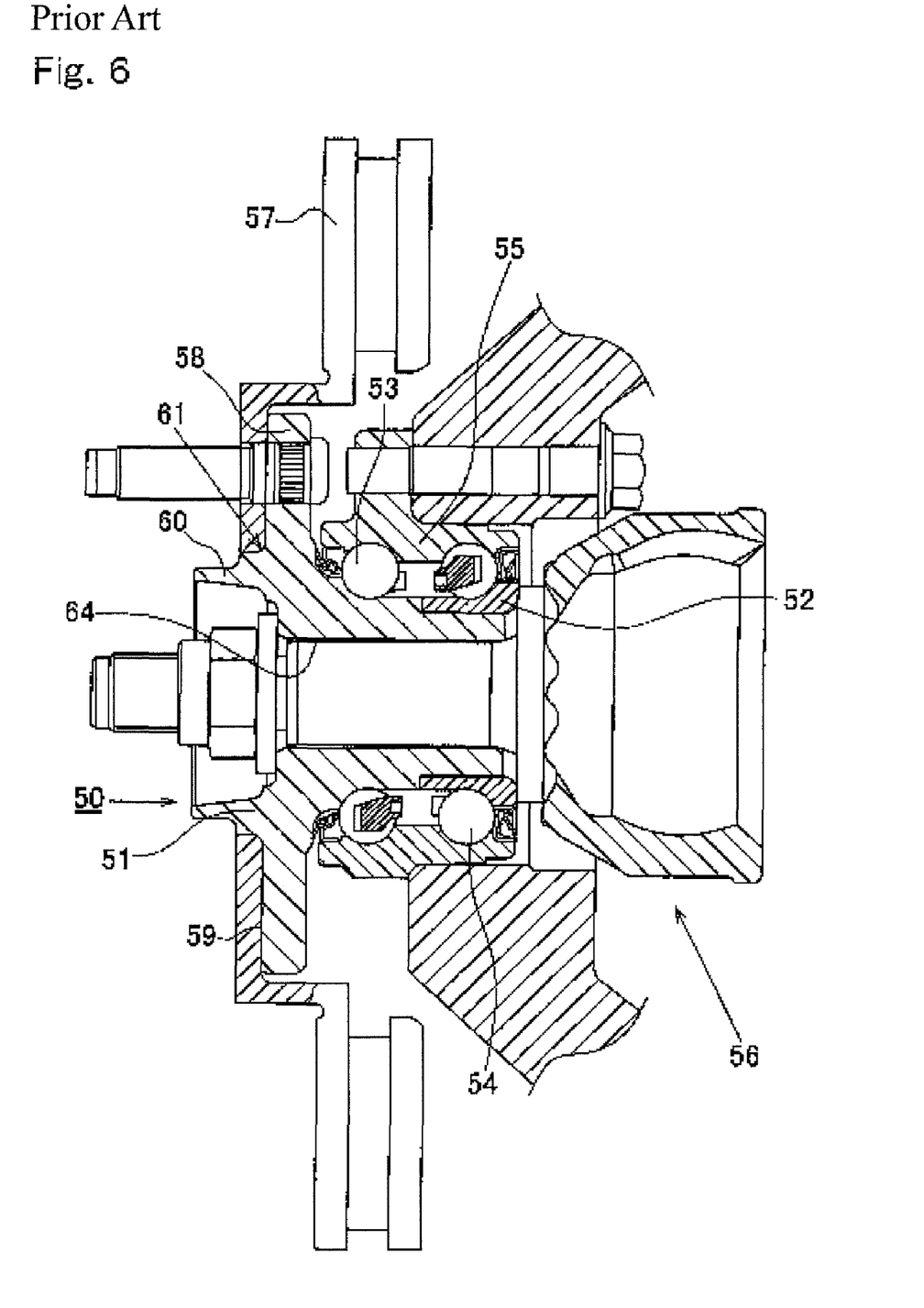
FIG. 6 is a longitudinal sectional view of another conventional wheel support bearing assembly.

Particularly, in the hub axle 51, in the case of making the wheel mounting flange 58 thin for weight reduction, a rotational bending stress is concentrated to a root portion in an outboard, that is, a corner portion 61 extending to a cylindrical pilot portion 60 from a brake rotor mounting surface 59, and thus, a countermeasure is required. Accordingly, there can be considered to reduce a stress by enlarging a dimension of the corner portion 61, that is, a radius of curvature. However, this countermeasure is restricted by a possible interference with a brake rotor 57 attached to the wheel mounting flange 58. Further, the hub axle 51 for the drive wheel is provided with a through hole having a serration portion 64 in an inner diameter portion, and a constant velocity universal joint 56 has a stem having a serration in an outer peripheral surface with these serrations engaged with each other. As a consequence, the rotational bending is also concentrated on a portion between a small-diameter stepped portion on which an inner race 52 is mounted and the serration portion 64 formed in the inner peripheral surface, and hence, there is a case in that a countermeasure improving a durability is required in the serration portion 64 if an induction hardening is not applied thereto.

Figure 5:
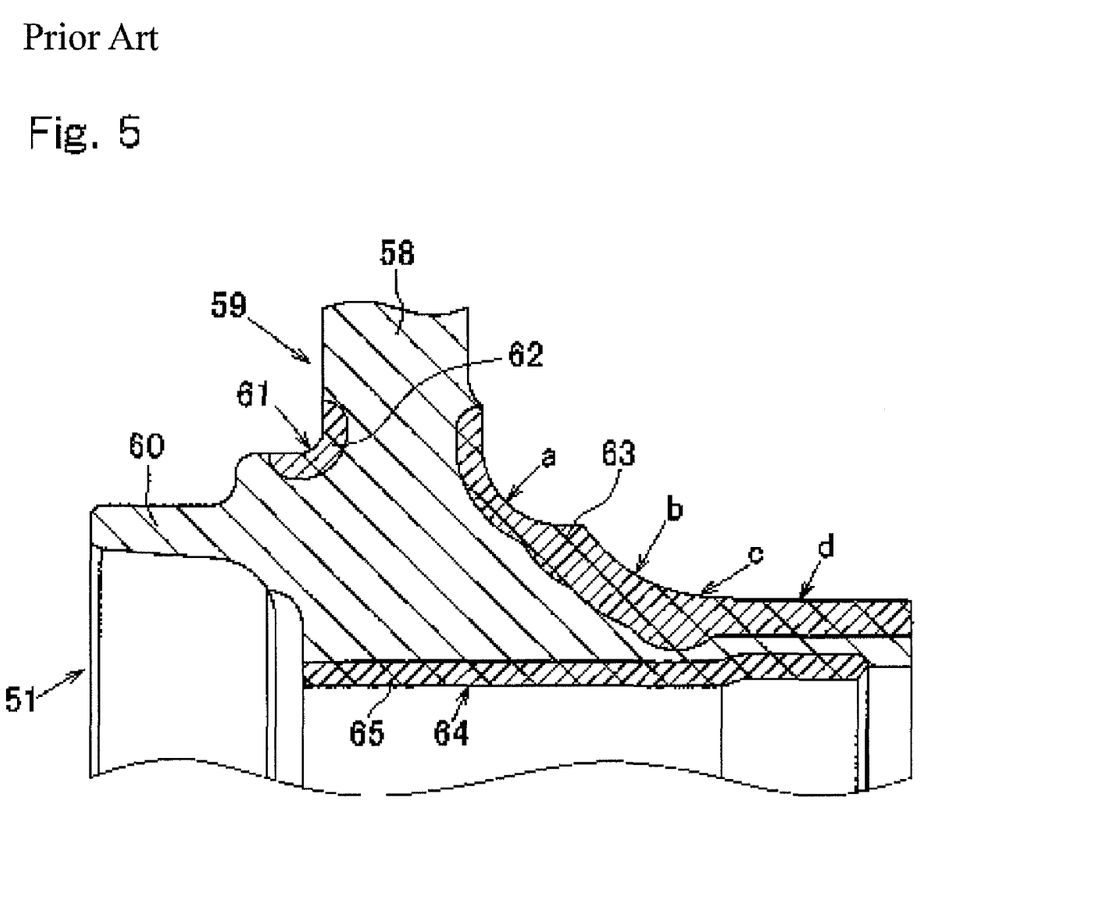
FIG. 5 is a longitudinal sectional view of a conventional wheel support bearing assembly.

Under the background mentioned above, the applicant of the present invention has already proposed a wheel support bearing assembly which can achieve a weight reduction and achieve an increase of a strength of the hub axle 51 without changing a shape and a dimension of the wheel mounting flange 58. The wheel support bearing assembly is processed, as shown in FIG. 5, such that a surface hardening layer 62 is formed by an induction hardening or the like in the corner portion 61 of the wheel mounting flange 58 of the hub axle 51. Accordingly, it is possible to make the corner portion 61 of the wheel mounting flange 58 forming a weakest portion of the rotational bending fatigue high in strength thereby to improve a durability of the hub axle 51.

Further, a surface hardened layer 63 is formed by the induction hardening or the like in other portions, that is, the portions including a seal land portion a with which a seal lip of an outboard seal device comes into slidable contact, a raceway surface b, a step c and the small-diameter stepped portion d. Further, a surface hardened layer 65 is formed in the serration portion 64 formed in the inner diameter portion of the hub axle 51. By the surface hardened layers 63 and 65, it is possible to improve a rotational bending fatigue strength, an abrasion resistance, a rolling fatigue service life and the like demanded in each of these portions a to d (for example, refer to pages 4 and 5 and FIG. 2 of Japanese Laid-open Patent Publication No. 2002-87008).

As mentioned above, in the conventional wheel support bearing assembly mentioned above, it is possible to achieve the increase of the strength of the hub axle 51 while achieving the weight reduction without changing the shape and the dimension of the wheel mounting flange 58, by forming the surface hardened layer 62 in the corner portion 61 of the wheel mounting flange 58 of the hub axle 51. However, there arised a new problem that a thermal refinement deformation is generated in the wheel mounting flange 58 by the induction hardening to amplify a surface runout of the brake rotor mounting surface 59. This tendency is also caused by a thinning of the wheel mounting flange 58. This surface runout affects an oscillation of the brake rotor 57 so as to generate a brake judder, whereby a steering stability of the motor vehicle and a drive feeling are deteriorated. In this case, there can be considered a method of further turning the brake rotor mounting surface 59 after the thermal refinement of the hub axle 51 to correct deformation so as to improve the surface runout. However, since a hardness difference exists between the corner portion 61 and the unhardened brake rotor mounting surface 59, another problem arises, that is, a slight step is generated in a boundary portion between the corner portion 61 and the brake rotor mounting surface 59. Further, in the case that the surface hardened layer 65 is formed in the serration portion 64 provided in the inner peripheral portion of the hub axle 51, the serration portion 64 generates a thermal refinement deformation which in turn causes a problem that a suitable clearance (a close fit or a clearance fit) can not be secured relative to the serration of the stem of the constant velocity universal joint.

In order to solve the problem mentioned above, the applicant of the present invention has proposed a method in that an outer member or an inner member having at least the wheel mounting flange integrally formed therein is subjected to thermal refinement (for example, refer to Japanese Laid-open Patent Publication No. 2005-3061). However, there has been required a structure which more securely improves a strength and a durability of the hub axle under the rotational bending condition.

SUMMARY OF THE INVENTION

In view of the foregoing, the present invention has been devised to provide a wheel support bearing assembly with an enhanced strength and a durability of a hub axle under a rotational bending condition while achieving a weight reduction, without changing a shape nor a dimension of a wheel mounting flange and without deteriorating a surface runout, as well as a manufacturing method thereof.

In accordance with the present invention, there is provided a wheel support bearing assembly including an outer member having double row outer raceway surfaces in an inner periphery, an inner member having double row inner raceway surfaces confronting the double row outer raceway surfaces, double row rolling elements rollingly accommodated between the outer and inner raceway surfaces, and a wheel mounting flange integrally formed in any one of the outer member and the inner member. At least the outer member or the inner member having the wheel mounting flange is made of a member subjected to air cooling or thermal refinement after being forged, the inner member is provided with a hub axle having an inner diameter portion thereof subjected to a shot peening treatment, and the respective raceway surfaces of the outer member and the inner member are hardened to a predetermined surface hardness.

In accordance with this structure, since the outer member or the inner member having at least the wheel mounting flange is air cooled or thermally refined after being forged, a grain size is regulated, for example, to number eight or more, the shot peening is applied to the inner diameter portion of the hub axle, and the respective raceway surfaces of the outer member and the inner member are hardened to the predetermined surface hardness, the following effects can be achieved. It is possible to increase a strength and a durability with respect to the rotational bending fatigue while keeping the existing working method and the existing facility without changing the shape and the dimension of the wheel mounting flange and the thickness of a shaft portion in the hub axle, as well as securing the predetermined bearing service life. The grain size represents a magnitude of the grain expressed by a microscope observed cross section, and is expressed by a grain size number N determined by the comparing method or the cutting method. The grain size number N is stipulated in Japanese Industrial Standards (JIS) G0551 or ISO 643 and defined by a formulation $m=8\times2^N$ using the number m of the grains per cross sectional area 1 $mm^2$ observed at 100 magnifications.

Preferably, the inner member is provided with the hub axle having the wheel mounting flange, and an inner race press-fitted to the hub axle, the inner raceway surface confronting one of the double row outer raceway surfaces of the outer member is directly formed on an outer peripheral surface of the hub axle, and the inner raceway surface confronting the other of the double row outer raceway surfaces is formed on the outer peripheral surface of the inner race. In this case, it is possible to achieve a reduction in size and weight of the wheel support bearing assembly. Also, since the shot peening treatment is applied to the inner diameter portion of the hub axle, it is possible to increase the strength and the durability of the hub axle in comparison with the conventional structure.

It is preferable to set a surface hardness of an outboard root portion of the wheel mounting flange to 20 HRC or more and 35 HRC or less. In this case, a workability of the cutting or the like is improved. Furthermore, since the thermal refinement deformation is not accompanied, it is possible to avoid a deterioration of the surface runout precision of the brake rotor mounting surface of the wheel mounting flange due to the thermal refinement deformation. Also, it is possible to prevent a surface hardness of a bolt hole to which a hub bolt is press-fitted from coming close to a surface hardness of the hub bolt thereby to prevent a fixing force of the hub bolt from being lowered due to a collapse of the serration of the hub bolt.

In this invention, a so-called self-retain structure may be employed, in which a crimped portion is formed by plastically deforming an inboard end portion of the hub axle radially outwardly thereby to fix the inner race to the hub axle in an axial direction. In this case, since it is not necessary to firmly fasten by a nut or the like so as to control a preload amount such as required in the conventional structure, the bearing assembly can be easily incorporated into the vehicle, and the preload amount can be maintained for a long time.

It is also preferable to set a surface hardness of the crimped portion to 20 HRC or more and 25 HRC or less by means of a tempering. With this tempering, a hardness deviation of the crimped portion is suppressed in comparison with a crimped portion remaining heat treatment free after forging, such as observed in the conventional structure. As a result, the workability is not lowered, generation of small cracks on the surface due to a plastic working is effectively suppressed, and a reliability in quality is improved further.

Preferably, a sealing device is installed to opposite end portions of the outer member, a seal land portion with which a seal lip of the outboard sealing device comes into slidable contact is formed in an inboard root portion of the wheel mounting flange, and a surface hardness of the seal land portion is set to 54 HRC or more and 64 HRC or less. With this feature, the mechanical strength is increased against a rotational bending load acting on the wheel mounting flange, and the strength and the durability of the hub axle are improved, as well as the abrasion resistance is improved.

The inner member or the outer member may be made of a medium carbon steel including carbon of 0.40 wt % or more and 0.80 wt % or less. This feature is advantageous in the light of an easiness of forging, a cutting performance, a heat treating performance and an economical aspect, and also is suitable for a hardening such as the induction hardening.

Preferably, the respective raceway surfaces of the outer member or the inner member subjected to air cooling or thermal refinement after the forging are hardened to a predetermined surface hardness, while a residual compressive stress in a portion of the hub axle extending from a rounded corner surface of a wheel mounting flange inboard root portion to an outer diameter surface of a shaft portion is defined to 200 MPa or more and 800 MPa or less, and a residual compressive stress of a surface of an inner diameter portion of the hub axle is defined to 50 MPa or more and 500 MPa or less.

In the case that the residual compressive stress of the surface of the inner diameter portion of the hub axle is less than 50 MPa, an effect of improving a fatigue strength and an effect of suppressing a generation of a fretting damage are small. Accordingly, the residual compressive stress equal to or more than 50 MPa is preferable. In order to further improve the fatigue strength and to suppress the generation of the fretting damage, it is preferable that the residual compressive stress of the surface of the inner diameter portion is equal to or more than 100 MPa. On the other hand, if the residual compressive stress of the surface of the inner diameter portion exceeds 500 MPa, other undesirable factors, for example, an excessive work hardening and/or crack generation tend to be significant. Accordingly, it is preferable that the residual compressive stress of the surface of the inner diameter portion is set to be equal to or less than 500 MPa.

Further, it has been observed that, when the compression stress not smaller than 200 MPa and not greater than 800 MPa exists in a portion of the hub axle extending from the rounded corner surface of the wheel mounting flange inboard root portion to the outer diameter surface of the shaft portion, a surface layer of this portion has a high hardness, and a suitable hardening pattern is obtained with respect to the thickness. Thus, the residual compressive stress may be limited within this range.

Accordingly, not only can the predetermined bearing service life be secured, but also the strength and the durability against the rotational bending fatigue are increased while keeping the existing working method and the existing facility without changing the shape and the dimension of the wheel mounting flange.

Further, a method of the present invention is directed to manufacture the wheel support bearing assembly of the present invention, and includes the steps of air cooling or heat treating at least the outer member or the inner member having the wheel mounting flange after forging, applying a shot peening treatment to an inner diameter portion of the hub axle in the inner member, and hardening the respective raceway surfaces of the outer member and the inner member to a predetermined surface hardness.

In accordance with this manufacturing method, it is possible to increase the strength and the durability with respect to the rotational bending fatigue while keeping the existing working method and the existing facility without changing the shape and the dimension of the wheel mounting flange and the thickness of the shaft portion, as well as to secure the predetermined bearing service life.

BRIEF DESCRIPTION OF THE DRAWINGS

In any event, the present invention will become more clearly understood from the following description of a preferred embodiment thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views.

FIGS. 2A and 2B are enlarged cross sectional views of an essential portion of the wheel support bearing assembly, in which FIG. 2A is an enlarged view showing a relation between a chamfer of an inner race and a rounded corner portion in a step portion, and FIG. 2B is an enlarged view schematically showing a state in which a shot peening treatment is applied to an inner diameter portion of a hub axle;

DETAILED DESCRIPTION OF EMBODIMENTS

A description in detail will be given below of embodiments in accordance with the present invention with reference to the accompanying drawings. In the following description, terms "outboard" and "inboard" represent one side of a vehicle body away from the longitudinal center of the vehicle body (a left side in the drawing) and the other side of the vehicle body close to the longitudinal center of the vehicle body, respectively, when assembled in the vehicle body. The following description includes a description of a manufacturing method of the wheel support bearing assembly.

Figure 1:
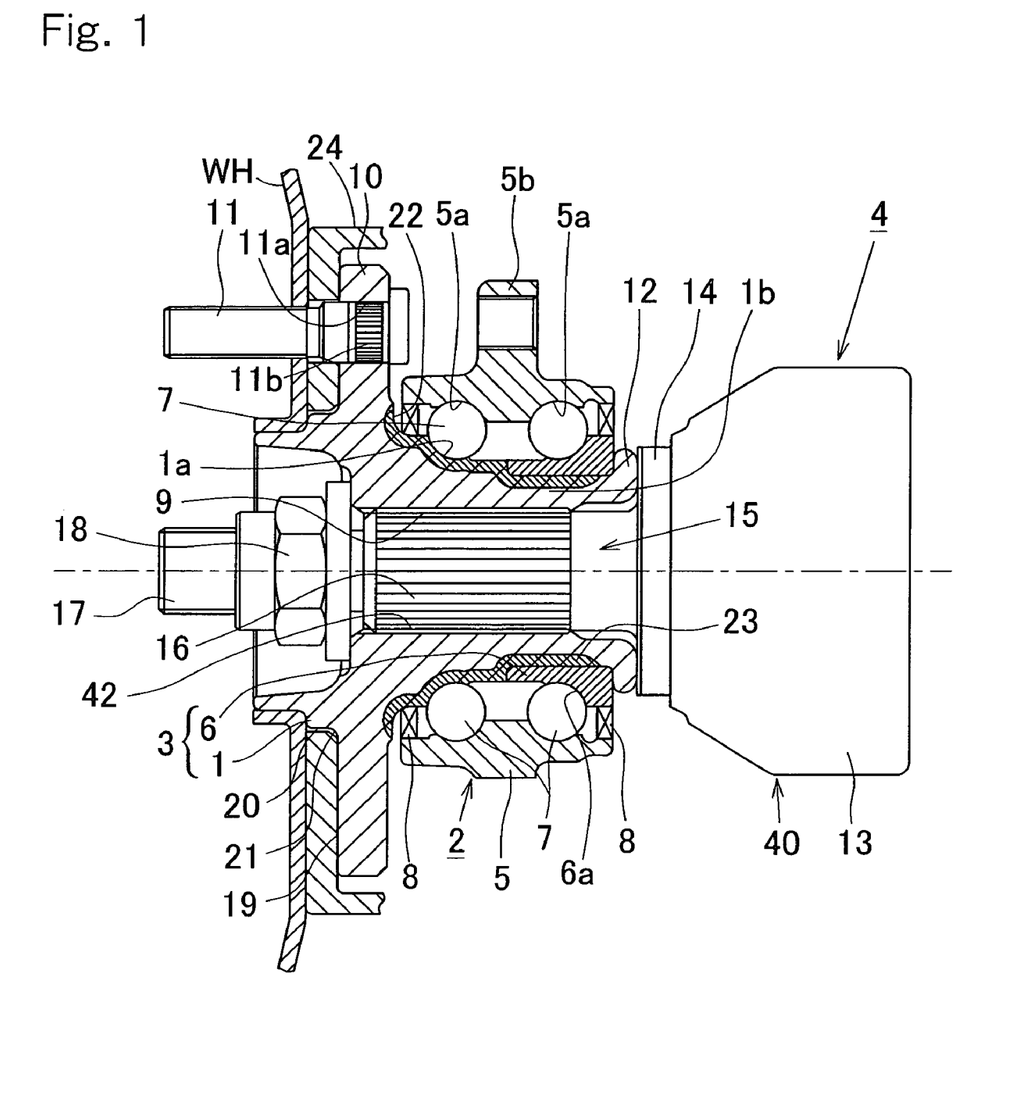
FIG. 1 is a longitudinal sectional view of a wheel support bearing assembly which is common to a first embodiment and a fourth embodiment in accordance with the invention.

The wheel support bearing assembly shown in FIG. 1 is provided for a drive wheel, and is structured in a single unit having a hub axle 1 and a double row rolling bearing 2 combined together, and an outer joint member 40 of a constant velocity universal joint 4 is engaged with an inner periphery of the hub axle 1 of the unit via a serration so as to transmit a torque.

The double row rolling bearing assembly includes an outer member 5 having double row outer raceway surfaces 5a, 5a formed in an inner periphery thereof, and a vehicle body mounting flange 5b integrally formed in an outer periphery thereof to be fixed to a vehicle body (not shown), a hub axle 1 in which one of double row inner raceway surfaces 1a, 1a confronting the outer raceway surfaces 5a, 5a is directly formed in an outer periphery, an inner race 6 which is press-fitted to a small-diameter stepped portion 1b of the hub axle 1, and in which the other inner raceway surface 6a is formed in an outer periphery, and double row rolling elements 7, 7 which are accommodated between the outer raceway surfaces 5a, 5a and the inner raceway surfaces 1a, 6a. The double row rolling elements 7, 7 are rollingly held by a cage (not shown). The hub axle 1 and the inner race 6 form an inner member 3. Further, sealing devices 8, 8 are installed to opposite end portions of the double row rolling bearing 2 to prevent a leakage of a lubricating grease sealed in an annular work space between the outer and inner members 1 and 3 and an intrusion of a rain water, a dust and the like from outside into the annular work space.

The hub axle 1 has a through hole 42 in the center portion and a torque transmitting serration (or spline) 9 is formed in a periphery of the through hole 42. The hub axle also has a wheel mounting flange 10 for mounting a wheel WH integrally formed in an outer periphery of an outboard end portion. A plurality of hub bolts 11 for fastening the wheel are provided uniformly in a circumferential direction of wheel mounting flange 10.

In the wheel support bearing assembly, the separately formed inner race 6 is presse-fitted to the small-diameter stepped portion 1b of the hub axle 1 and subsequently, a crimped portion 12 is formed by plastically deforming an end portion of the small-diameter stepped portion 1b radially outwardly to thereby fix the inner race 6 to the hub axle 1 in an axial direction. As such, the double row rolling bearing 2 is unitized in combination with the hub axle 1 to form the wheel support bearing assembly. On the basis of the unitization mentioned above, it is possible to provide a third generation wheel support bearing assembly having a so-called self-retain structure in which a preload of the double row rolling bearing 2 can be controlled without using any fastening means such as a fixing nut. In this case, there has been exemplified a double row angular ball bearing in which balls are employed as the rolling elements 7, but a double row tapered roller bearing using tapered rollers may be employed.

The constant velocity universal joint 4 is provided with the outer joint member 40, an inner joint member (not shown), torque transmitting balls (not shown) accommodated between the inner joint member and the outer joint member 40, and a cage retaining the torque transmitting balls uniformly in a circumferential direction. The outer joint member 40 is integrally formed with a cup-shaped mouth portion 13, a shoulder portion 14 forming a bottom portion of the mouth portion 13, and a stem portion 15 extending in an axial direction from the shoulder portion 14. A serration (or a spline) 16 is formed on an outer peripheral surface of the stem portion 15, and a male thread 17 is formed in an end portion of the stem portion 15.

The stem portion 15 is inserted into the through hole 42 and the serration 16 of the stem portion 15 engages with the serration 9 formed in the hub axle 1 to thereby enabling a torque transmission from the stem portion 15 to the hub axle 1. Further, the constant velocity universal joint 4 is detachably fixed to the double row rolling bearing assembly by fastening the end portion of the stem portion 15 to the hub axle 1 by a fixing nut 18 with the end surface of the shoulder portion 14 abutted to the crimped portion 12 of the hub axle 1.

Figure 2A:
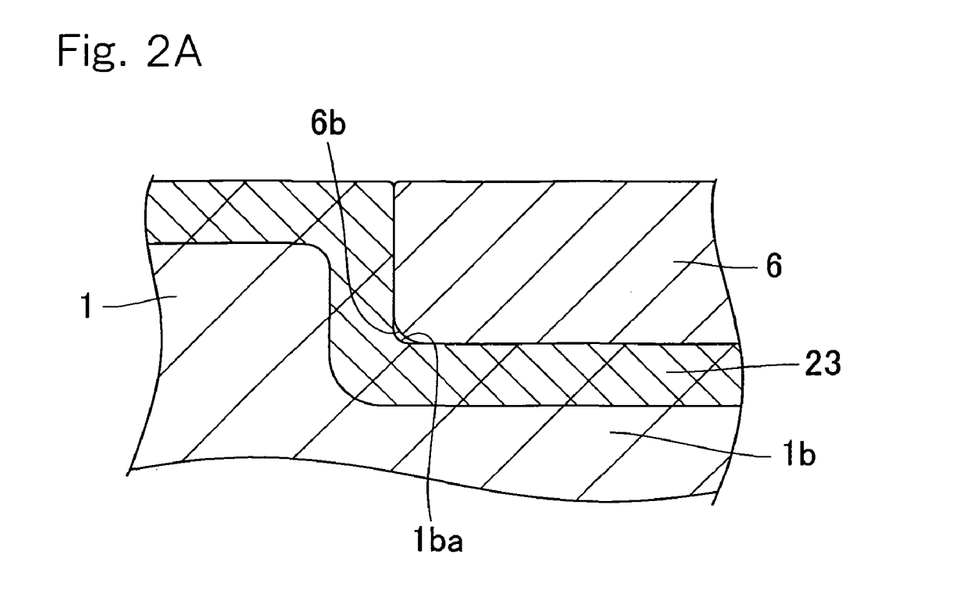

In the wheel support bearing assembly, the hub axle 1 is formed by hot forging a medium carbon steel including 0.40 wt % or more and 0.80 wt % or less carbon, for example, S53C stipulated in Japanese Industrial Standards (JIS). The hub axle 1 is subsequently subjected to a thermal refinement treatment or to an air cooling treatment mentioned below to obtain a grain size equal to or higher than number 8, and thereafter subjected to a turning work to obtain a predetermined shape and dimension. A root portion in an outboard side in the wheel mounting flange 10, that is, a corner portion 21 extending from a brake rotor mounting surface 19 to a cylindrical pilot portion 20 forming a supporting surface to support a brake rotor 24 is formed in an arcuate surface or in a runoff portion having a radius of curvature as large as possible while avoiding an interference with the brake rotor 24. Further, as shown in FIG. 2A, the hub axle 1 has a shaft portion formed with a small-diameter stepped portion 1b on which the inner race 6 is mounted. The small-diameter stepped portion 1b has a corner portion 1ba which is so formed and shaped not to interfere with a chamfered portion 6b of the inner race 6 which is grinded simultaneously with cutting of the shaft portion.

In this first embodiment, the hub axle 1 is hot forged, for example, in the temperature range of 1050° C. to 1300° C., and subsequently subjected to a thermal refinement in which the hub axle 1 is left to be temporarily cooled to a room temperature followed by a tempering at high temperature of not lower than 400° C. (preferably, quenching for a holding time not shorter than 1 hour and not longer than 3 hours at a temperature not lower than 800° C. and not higher than 900° C.→cooling→tempering for a holding time not shorter than 1 hour and not longer than 3 hours at a temperature not lower than 400° C. and not higher than 700° C.), thereby to obtain a troostite structure or a sorbite structure. By such thermal refinement, the structure is granulated to the grain size 8 or more, and a mechanical characteristic such as tensile strength, bending strength or impact value is improved resulting in enhanced ductility and toughness.

The mechanical strength is improved by increasing the surface hardness mentioned above, however, the surface hardness after the thermal refinement is set to 20 HRC or more and 35 HRC or less. If the surface hardness is set to be more than 35 HRC, a cutting performance is lowered by an increase of the hardness, service lives of a cutting tool and a broaching tool become shorter, and a surface runout precision of the brake rotor mounting surface 19 of the wheel mounting flange 10 and a precision of the serration are deteriorated in the cutting work. Further, there arises a risk that a surface hardness of the bolt hole 11a to which the hub bolt 11 is press-fitted comes close to a surface hardness of the hub bolt 11 thereby to collapse the serration 11b of the hub bolt 11 accompanied by a significant lowering of a fixing force of the hub bolt 11 to the bolt hole 11a.

Further, if the surface hardness of the inboard end portion of the hub axle 1 exceeds 35 HRC, there arises a risk that, not only a workability is lowered, but also small cracks are generated on the surface by the plastic working to form the crimped portion 12, so that a reliability of the crimped portion 12 is lowered in terms of quality. While it is preferable that the surface hardness is low in terms of plastic working, sufficient mechanical characteristics are not secured with the surface hardness smaller than 20 HRC. Accordingly, the reliability is improved by setting the surface hardness in the crimped portion 12 to 20 HRC or more and 35 HRC or less, and preferably 20 HRC or more and 25 HRC or less.

Figure 2B:
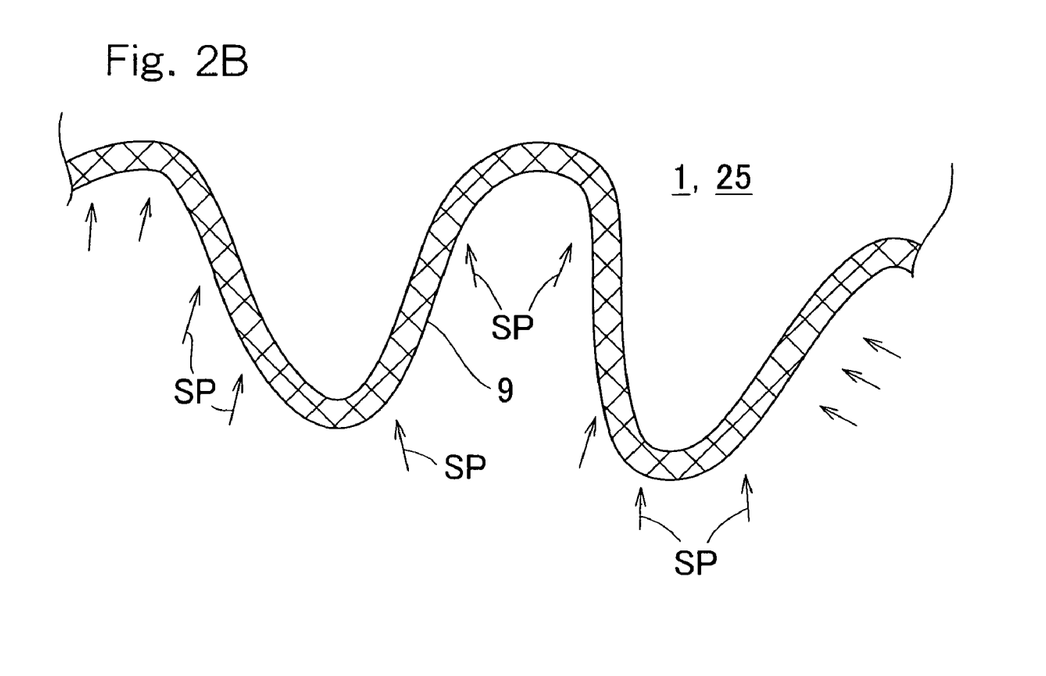

As mentioned above, a predetermined hardness is obtained by applying an appropriate treatment to make the grain size of the hub axle 1 equal to or more than number 8 after forging, for example, the thermal refinement, together with the shot peening SP to the inner diameter portion of the hub axle 1, as shown in FIG. 2B.

The shot peening treatment SP here means a cold working process of accelerating and injecting hard small balls each having a grain diameter about 10 μm to 1.3 mm from a shooting machine (not shown) so as to impinge on a worked part or portion at a high speed. By the shot peening SP a surface layer portion of the worked part or portion is work hardened, and a residual compressive stress is generated. Recently, there are also a wide peening cleaning (WPC) and a fine particle peening (FPC), which are in some cases differentiated from the shot peening. However, since the WPC and the FPC correspond to the shot peening treatment in a broad meaning, they are included in "the shot peening treatment" in this application.

The surface layer portion is hardened to the hardness of 24 HRC or more and 40 HRC or less and the residual compressive stress of 400 MPa or more and 600 MPa or less, by, for example, a so-called nozzle type shot peening treatment in which, from a shot nozzle disposed against inner diameter surface of the hub axle 1, accelerated rigid balls of, for example, a grain diameter not smaller than 30 μm and not greater than 80 μm are shot against that surface under the range of pressure not lower than 0.3 MPa and not higher than 0.5 MPa for not shorter than 10 seconds and not longer than 30 seconds while rotating the hub axle 1.

For the controlled shot peening treatment of the inner diameter portion of the hub axle 1, a hardness of the surface layer portion may be used and the residual compressive stress of the surface layer may be determined by using an X-ray residual stress measuring device. The residual compressive stress of the surface layer portion is preferably set to 50 MPa or more and 500 MPa or less.

Since the effect of improving the fatigue strength and the effect of suppressing the generation of the fretting damage are small for the residual compressive stress of the surface layer portion less than 50 MPa, the stress of 50 MPa or more is preferable. In order to further improve the fatigue strength and suppress the generation of the fretting damage, it is preferable that the residual compressive stress of the surface layer portion is not smaller than 100 MPa. On the other hand, if the residual compressive stress of the surface layer portion exceeds 500 MPa, other undesirable factors due to large compression stress, for example, excessive work hardening and/or crack generation tend to be significant. Accordingly, it is preferable that the residual compressive stress of the surface layer portion is set to be not greater than 500 MPa. The similar effects can be seen in the portion forming the hardened layer in the outer diameter portion of the hub axle 1.

Since the inner diameter surface of the hub axle 1 is work hardened as mentioned above, and the residual compressive stress is properly generated, the strength of the corner portion 21 or the weakest portion with respect to the rotational bending fatigue and the strength of the shaft portion of the hub axle 1 are enhanced while keeping the existing working method and the existing facility without changing the shape and the dimension of the wheel mounting flange 10 and the thickness of the shaft portion. Also, it is possible to improve the surface runout precision of the brake rotor mounting surface 19 of the wheel mounting flange 10 in comparison with the conventional structure, by applying the turning work after the forging and the thermal refinement. Further, the crack generation in the crimped portion 12 is suppressed without lowering the workability of the plastic working to form the crimped portion 12 thereby to maintain a reliability in the quality. In FIG. 2B, the position to which the shot peening treatment SP is applied is shown by a cross hatching.

The thermal refinement after forging the hub axle 1 is described hereinafter for the case in which the whole surface thermal refinement is carried out by holding the hub axle 1 in the thermal refinement furnace. However, a partial thermal refinement may be employed, in which a predetermined surface hardness is obtained by heating, for example, only the corner portion 21 of the wheel mounting flange 10, the inner diameter serration portion 9, and the inboard end portion of the hub axle 1 forming the crimped portion 12 by an induction hardening after the cutting work. In this case, since it is not necessary to consider the workability for the cutting work or the like, it is possible to appropriately set a predetermined portion to a predetermined surface hardness, for example, to set the surface hardness of the corner portion 21 of the wheel mounting flange 10 to 20 HRC or more and 40 HRC or less, and the surface hardness of the crimped portion 12 to 20 HRC or more and 25 HRC or less.

Further, in the hub axle 1, a hardened layer 23 of the surface hardness not smaller than 54 HRC and not greater than 64 HRC is formed by the induction hardening in a seal land portion 22 slidably contacted to the sealing device 8 and the small-diameter portion 1b, as well as in the outboard inner raceway surface 1a. Accordingly, the seal land portion 22 is not only improved in an abrasion resistance, but also has a sufficient mechanical strength against the rotational bending load applied to the wheel mounting flange 10, and as a result, the durability of the hub axle 1 is improved. The inner race 6 press-fitted to the small-diameter stepped portion 1b is made of a high carbon chromium bearing steel such as SUJ2 defined by JIS, and is hardened in the range of 58 HRC to 64 HRC deep into a core portion by a dipping quenching.

On the other hand, the outer member 5 is formed by the medium carbon steel including 0.40 wt % or more and 0.80 wt % or less carbon, such as S53C in the same manner as the hub axle 1, and the inner diameter surfaces of the respective end portions to which the sealing devices 8, 8 are fitted, as well as the double row outer raceway surfaces 5a, 5a, are hardened in the surface hardness range of 54 HRC to 64 HRC by the induction hardening.

The description is given above of the manufacturing step of the hub axle 1, having the hot forging→the thermal refinement→the primary turning (the step of turning to give the shape close to the finish shape) and the bolt hole forming→the induction hardening→the secondary turning (the step of finish turning the brake rotor mounting surface 19 of the wheel mounting flange 10, the inner diameter portion and the like)→the broaching work→the shot peening. However, the manufacturing step is not limited to this, but may be constituted by steps having the hot forging→the thermal refinement→the turning and bolt hole forming→the induction hardening→the broaching work→the shot peening, or the hot forging→the turning and bolt hole forming→the broaching work→the induction hardening→the shot peening. An efficiency of the work can be enhanced by appropriately selecting the manufacturing steps in conformity to the structure of the manufacturing line.

Figure 3:
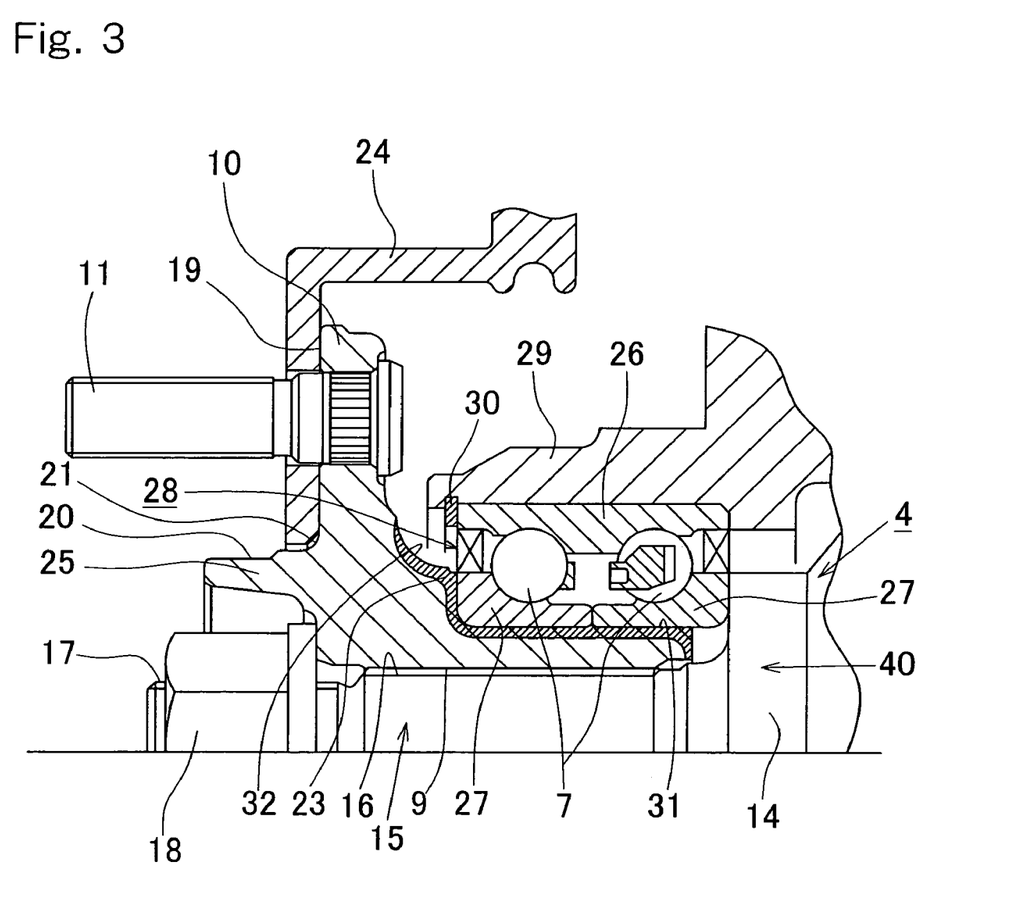
FIG. 3 is a longitudinal sectional view of the wheel support bearing assembly according to a second embodiment and a fifth embodiment of the present invention.

FIG. 3 illustrates a wheel support bearing assembly in accordance with a second embodiment of the present invention. The second embodiment corresponds to a so-called first generation wheel support bearing assembly, and the same reference numerals are used to denote identical portions, identical parts or like parts having like functions with the embodiment mentioned above, and a detailed description thereof will be obviated.

The wheel support bearing assembly includes a hub axle 25 to which a wheel (not shown) together with a brake rotor 24 are fixed, a wheel support bearing 28 rotatably supporting the hub axle 25 and having an outer race 26, and a pair of inner races 27, 27, and double row of rolling elements 7, 7 rollingly accommodated between the inner and outer races 27 and 26. The wheel support bearing 28 is supported by a knuckle 29 of a vehicle body, and a constant velocity universal joint 4 is coupled to the hub axle 25 so as to transmit a power of a drive shaft (not shown) to the hub axle 25. In this case, there has been exemplified a double row angular ball bearing in which balls are employed as the rolling elements 7, 7, but a double row tapered roller bearing using tapered rollers may be employed.

The outer race 26 of the wheel support bearing 28 is fitted to an inner periphery of the knuckle 29, and fixed in an axial direction by a stop ring 30. On the other hand, a pair of inner races 27 and 27 are press-fitted to a small-diameter stepped portion 31 formed in the hub axle 25, and the constant velocity universal joint 4 is detachably fixed to the bearing by fastening the end portion of the stem portion 15 by the fixing nut 18 with the shoulder portion 14 of the outer joint member 40 abutted to a large-diameter end surface of the inboard inner race 27.

In this wheel support bearing assembly, the hub axle 25 is formed through the similar process as in the first embodiment, using the identical material, thermal refinement and shot peening to obtain the surface hardness thereof not smaller than 20 HRC and not greater than 35 HRC.

Further, an inboard root portion 32 of the wheel mounting flange 10 of the hub axle 25 is formed in an arcuate surface having a large radius of curvature, and the hardened layer 23 having the surface hardness in the range of 54 HRC to 64 HRC is formed, by the induction hardening, on a portion extending from the root portion 32 to the small-diameter portion 31. With these surface treatments the hub axle 1 exhibits a sufficient mechanical strength against the rotational bending load applied to the wheel mounting flange 10 and the durability of the hub axle 25 is improved.

Each of inner races 27 and 27 press-fitted to the small-diameter stepped portion 31 is made of a high carbon chromium bearing steel such as the SUJ2, and is hardened in the range of 58 HRC to 64 HRC deep into a core portion by a dipping quenching. With the hardened layer 23 formed in the small-diameter stepped portion 31, the fretting abrasion on the fitting surface with the inner races 27 and 27 is effectively suppressed. As a consequence, a rust, an abrasion or a galling on the fitting surface with the inner races 27, 27 is prevented from generating due to the generation of the fretting abrasion, thereby to avoid a damage of the inner races 27, 27 to improve a durability. Also the inner diameter surface of the hub axle 25 is work hardened by applying the shot peening treatment SP or the like in the same manner as shown in FIG. 2B to the surface of the serration 9 formed on the inner peripheral surface of the hub axle 25, generating appropriate compressive stress. On the other hand, the outer race 26 is made of a high carbon chromium bearing steel such as the SUJ2, in the same manner as the inner race 27, and is hardened in the range of 58 HRC to 64 HRC deep into the core portion by the dipping quenching. In accordance with the wheel support bearing assembly in FIG. 3 described above, it is possible to achieve the same effect as the wheel support bearing assembly in FIG. 1.

Figure 4:
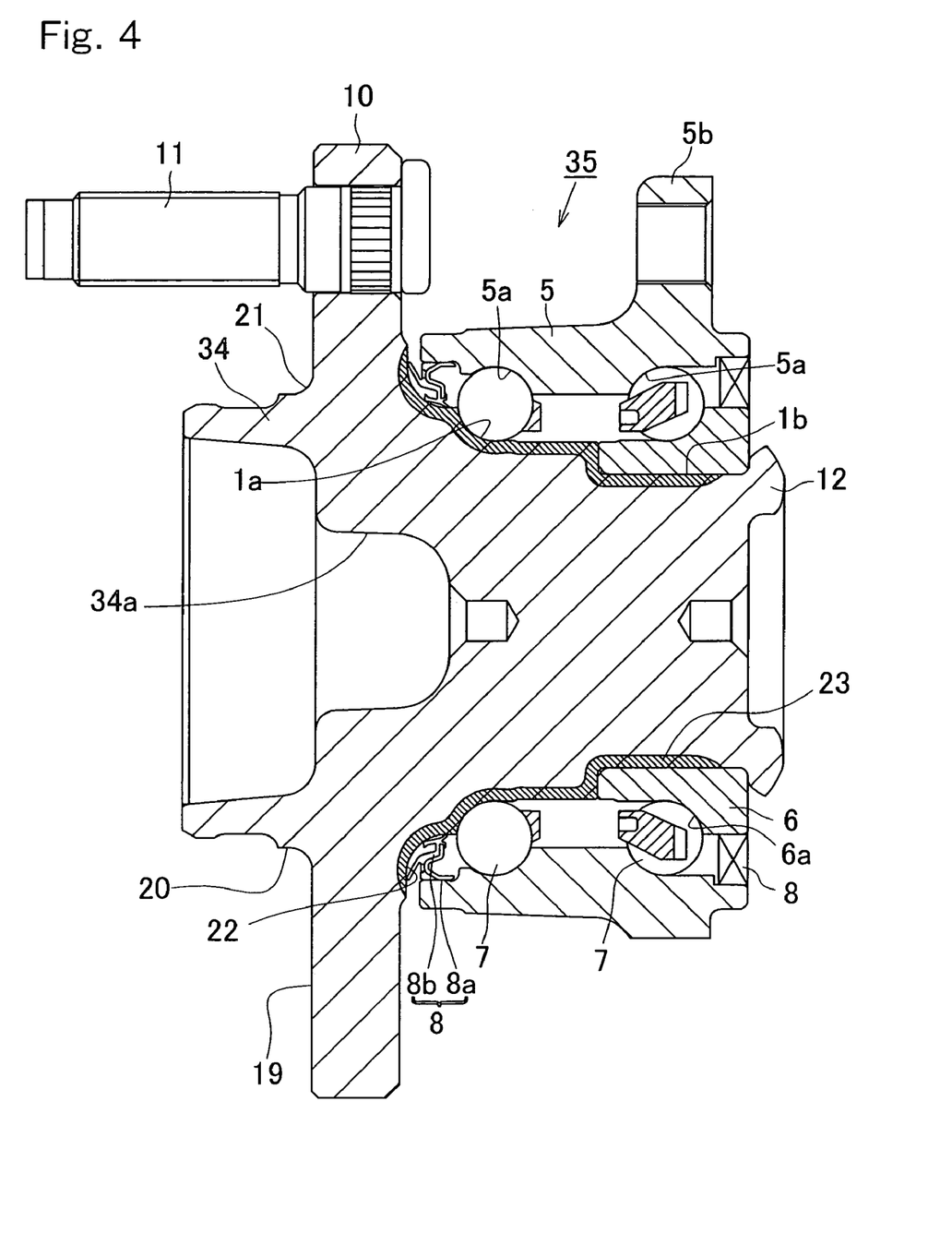
FIG. 4 is a longitudinal sectional view of the wheel support bearing assembly according to a third embodiment and a sixth embodiment of the present invention.

FIG. 4 illustrates a wheel support bearing assembly in accordance with a third embodiment of the present invention. The third embodiment corresponds to a so-called third generation wheel support bearing assembly, the same reference numerals are used to denote identical portions, identical parts or like parts having like functions with the first embodiment mentioned above, and a detailed description thereof will be obviated.

The wheel support bearing assembly is used for a driven wheel, and structured in a single unit having a hub axle 34 and a double row rolling bearing 35 combined together. The double row rolling bearing assembly includes the outer member 5, the hub axle 34, the independent inner race 6 separate from the hub axle 34 and press-fitted to the small diameter stepped portion 1b of the hub axle 34, and the double row rolling elements 7, 7. The hub axle 34 has no through hole for the constant velocity universal joint.

In the wheel support bearing assembly, the hub axle 34 is formed through the similar process as in the first embodiment, using the identical material, thermal refinement and shot peening to obtain the surface hardness thereof not smaller than 20 HRC and not greater than 35 HRC. The shot peening is applied to an inner diameter portion 34a of the hub axle 34.

The hardened layer 23 with the surface hardness not smaller than 54 HRC and not greater than 64 HRC is formed by the induction hardening in a region from the seal land portion 22 having a large radius of curvature to the small-diameter stepped portion 1b. The sealing device 8 is identical with that employed in the first embodiment and includes annular core member 8a made of a metal, and an elastic member 8b made of a rubber material and fixed to the core member 8a. The sealing device 8 is installed to the outer member 5 with the core member 8a press-fitted to the inner periphery thereof. The elastic member 8b contacts with the seal land portion 22.

In accordance with the wheel support bearing assembly described above, the whole surface thermal refinement is applied to the medium carbon steel or the raw material of the hub axle 34, after hot forging, to obtain the grain size equal to or 8, thereby to set the surface hardness not smaller than 20 HRC and not greater than 35 HRC. In addition to such surface hardness obtained by the thermal refinement, the shot peening treatment SP or the like is applied to the inner diameter portion 34a of the hub axle 34 to increase the rotational bending fatigue strength without changing the shape and the dimension of the wheel mounting flange 10 and the thickness of the inner diameter portion. Also, the same effects as the first embodiment shown in FIG. 1 can be achieved.

In the third embodiment, there has been exemplified the structure in which the wheel mounting flange 10 is integrally formed in the hub axle 34, however, the structure is not limited to this. The present invention can be applied to an outer race rotating type wheel support bearing assembly in which the wheel mounting flange is integrally formed in the outer member.

Next, a description will be given of a wheel support bearing assembly in accordance with a fourth embodiment of the invention. Since the fourth embodiment has a basic structure similar to that of the first embodiment, a description will be given of features different therefrom with reference to FIGS. 1 and 2.

The hub axle in accordance with the first embodiment was formed as the predetermined shape and dimension by hot forging the medium carbon steel including 0.40 wt % or more and 0.80 wt % or less carbon, for example, S53C and the like, followed by the thermal refinement or the air cooling to make the grain size equal to or higher than 8, and the final turning work. On the contrary, the hub axle 1 in accordance with the fourth embodiment is formed as predetermined shape and dimension by hot forging the medium carbon steel, followed by the air cooling or the thermal refinement and the turning work. By this process, a residual compressive stress of a portion extending from a rounded corner surface of an inboard root portion or the seal land portion 22 in an inboard side in the wheel mounting flange 10 of the hub axle 1 to an outer diameter surface of a shaft portion thereof is set to be not smaller than 200 MPa and not greater than 800 MPa, and a residual compressive stress of the surface of the inner diameter portion of the hub axle 1 is set to be not smaller than 50 MPa and not greater than 500 MPa.

Since the double row rolling bearing 2 is fitted to the outer diameter surface of the shaft portion of the hub axle 1, and a great load is applied thereto, the fretting damage tends to occur on the outer diameter surface contacting with the inner race 6. Also, in the hub axle 1, in order to maintain the strength (the rigidity) against the great load, it is preferable to form the induction hardening hardened layer to a predetermined depth. In order to confirm the achievement of the suitable induction hardening hardened layer, a control of the compression stress in the surface layer is effective. Accordingly, the compression stress used as a factor to be controlled. Where the compression stress not smaller than 200 MPa, preferably in the range of 200 MPa to 800 MPa exists in the surface layer (at the depth from 0.05 mm to 0.1 mm under the surface) of the portion from the rounded corner surface of the inboard root portion 22 to the outer diameter surface of the shaft portion, the surface layer can have the high surface hardness and a suitable hardening pattern with respect to the thickness. Accordingly, the compression stress was set to these numerical values.

On the other hand, with regard to the inner diameter portion of the hub axle 1, the strength of the serration 9 is essential. The serration 9 is engaged with the serration 16 of the stem portion 15 of the constant velocity universal joint 4, and receives a torsion at the time of rotating torque transmitting. Accordingly, the strength against the fretting, the torsion and the bending is required. Since the existence of the compression stress is effective for the intended use mentioned above, it is effective to form an appropriate compression stress by, in addition to the thermal refinement, the machining work such as the turning work and the broaching work, or the shot peening work. In this fourth embodiment the residual compressive stress of the surface of the inner diameter portion of the hub axle 1 is set to be not smaller than 50 MPa and not greater than 500 MPa by applying the shot peening, in the same manner as in the first embodiment.

In the above mentioned residual compressive stress range of the inner diameter portion, particularly, the residual compressive stress of not smaller than 300 MPa is effective to attain a sufficient strength with respect to the fretting, the torsion and the bending.

Next, a description will be given of a wheel support bearing assembly in accordance with a fifth embodiment of the invention. Since the fifth embodiment has a basic structure similar to that of the second embodiment, a description will be given of features different therefrom with reference to FIG. 3.

In the second embodiment, the hub axle 25 was applied the whole surface thermal refinement to obtain the grain size equal to or more than 8 after hot forging the medium carbon steel including 0.40 wt % or more and 0.80 wt % or less carbon such as S53C, and set its surface hardness to be not smaller than 20 HRC and not greater than 35 HRC. In the fifth embodiment, in addition to these features in the second embodiment, an outer surface portion extending from the inboard root portion 32 of the wheel mounting flange 10 to the outer diameter portion of the shaft portion in the hub axle 1 is set to have the residual compressive stress not smaller than 200 MPa and not greater than 800 MPa. Furthermore, the shot peening treatment same as in the first embodiment is applied to the inner diameter portion of the hub axle 25.

Further, a description will be given of a wheel support bearing assembly in accordance with a sixth embodiment of the invention. Since the sixth embodiment has a basic structure similar to that of the third embodiment, a description will be given of features different therefrom with reference to FIG. 4.

In the third embodiment, the hub axle 34 was applied the whole surface thermal refinement to obtain the grain size equal to or more than 8 after hot forging the medium carbon steel including 0.40 wt % or more and 0.80 wt % or less carbon such as S53C, and set its surface hardness to be not smaller than 20 HRC and not greater than 35 HRC. In the sixth embodiment, in addition to these features in the third embodiment, an outer surface portion extending from the inboard root portion 32 of the wheel flange 10 to the outer diameter portion of the shaft portion in the hub axle 34 is set to have the residual compressive stress not smaller than 200 MPa and not greater than 800 MPa, and the residual compressive stress of the surface of the inner diameter portion of the hub axle 34 is set to be not smaller than 300 MPa and not greater than 600 MPa.

It is possible to increase the rotational bending fatigue strength without changing the shape and the dimension of the wheel mounting flange 10, by giving the hub axle 34 the predetermined surface hardness and the suitable residual compression stress to the portion subjected to the fatigue so as to reinforce the hub axle 34.

Further, the seal land portion 22 and the small-diameter stepped portion 1b are hardened in the same manner as in the first embodiment to form the hardened layer 23 of the surface hardness not smaller than 54 HRC and not greater than 64 HRC.

Furthermore, the shot peening treatment same as the in first embodiment is applied to the inner diameter portion of the hub axle 34.

In each of the foregoing embodiments in accordance with the invention, the shot peening treatment was carried out, however, the following aspects can be provided as applicable aspects including no shot peening treatment.

In accordance with the applicable aspect, there is provided a wheel support bearing assembly including:

an outer member having double row outer raceway surfaces in an inner periphery;

an inner member having double row inner raceway surfaces confronting the double row outer raceway surfaces;

double row rolling elements rollingly accommodated between the outer and inner raceway surfaces;

and a wheel mounting flange integrally formed in any one of the outer member and the inner member, wherein at least the outer member or the inner member having the wheel mounting flange is made of a member subjected to air cooling or thermally refined after being forged, the respective raceway surfaces are hardened to a predetermined surface hardness, the inner member is provided with a hub axle and a shaft portion, a residual compressive stress in a portion extending from a rounded corner surface of an inboard root portion of the wheel mounting flange of the hub axle to an outer diameter surface of the shaft portion is defined to 200 MPa or more and 800 MPa or less, and a residual compressive stress of a surface of an inner diameter portion of the hub axle is defined to 50 MPa or more and 500 MPa or less.

As mentioned above, in the case that the residual compressive stress of the surface of the inner diameter portion of the hub axle is less than 50 MPa, the effect of improving the fatigue strength and the effect of suppressing the generation of the fretting damage is small. In order to further improve the fatigue strength and suppressing the generation of the fretting damage, it is preferable that the residual compressive stress of the surface of the inner diameter portion is set to be not smaller than 100 MPa. On the other hand, if the residual compressive stress of the surface of the inner diameter portion exceeds 500 MPa, undesirable factors, for example, excessive work hardening and/or crack generation tend to be significant.

Further, where the compression stress not smaller than 200 MPa and not greater than 800 MPa exists in a portion extending from the rounded corner surface of the wheel mounting flange inboard root portion to the outer diameter surface of the shaft portion in the hub axle, it has been observed that the surface layer of this portion has the high hardness and the suitable hardening pattern with respect to the thickness.

Accordingly, it is possible to increase the strength and the durability against the rotational bending fatigue as well as the desired bearing service life while keeping the existing working method and the existing facility without changing the shape and the dimension of the wheel mounting flange.

Although the present invention has been fully described in connection with the preferred embodiment thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A wheel support bearing assembly comprising:
   an outer member having double row outer raceway surfaces in an inner periphery;
   an inner member having double row inner raceway surfaces confronting the double row outer raceway surfaces;
   double row rolling elements rollingly accommodated between the outer and inner raceway surfaces; and
   a wheel mounting flange integrally formed in the inner member, wherein the inner member having the wheel mounting flange is made of a member subjected to air cooling or thermal refinement after being forged, the inner member is provided with a hub axle having an inner diameter portion thereof subjected to a shot peening treatment, and the respective raceway surfaces of the outer member and the inner member are hardened to a predetermined surface hardness.

2. A wheel support bearing assembly as claimed in claim 1, wherein an inner race is press-fitted to the hub axle, the inner raceway surface confronting one of the double row outer raceway surfaces of the outer member being directly formed on an outer peripheral surface of the hub axle, and the inner raceway surface confronting the other of the double row outer raceway surfaces being formed on the outer peripheral surface of the inner race.

3. A wheel support bearing assembly as claimed in claim 2, wherein a crimped portion is formed by plastically deforming an inboard end portion of the hub axle radially outwardly thereby to fix inner race to the hub axle in an axial direction.

4. A wheel support bearing assembly as claimed in claim 3, wherein a surface hardness of the crimped portion is set to 20 HRC or more and 25 HRC or less by means of a tempering.

5. A wheel support bearing assembly as claimed in claim 1, wherein a surface hardness of an outboard root portion of the wheel mounting flange is set to 20 HRC or more and 35 HRC or less.

6. A wheel support bearing assembly as claimed in claim 1, wherein a sealing device is installed to opposite end portions of the outer member, a seal land portion with which a seal lip of the outboard sealing device comes into slidable contact is formed in an inboard root portion of the wheel mounting flange, and a surface hardness of the seal land portion is set to 54 HRC or more and 64 HRC or less.

7. A wheel support bearing assembly as claimed in claim 1, wherein the inner member or the outer member is made of a medium carbon steel including carbon of 0.40 wt. % or more and 0.80wt. % or less.

8. A wheel support bearing assembly as claimed in claim 1, wherein the raceway surface of at least the inner member having the wheel mounting flange and subjected to air cooling or thermal refinement after the forging is hardened to a predetermined surface hardness, while a residual compressive stress in a portion of the hub axle extending from a rounded corner surface of a wheel mounting flange inboard root portion to an outer diameter surface of a shaft portion is defined to 200 MPa or more and 800 MPa or less, and a residual compressive stress of a surface of an inner diameter portion of the hub axle is defined to 50 MPa or more and 500 MPa or less.

9. A manufacturing method of a wheel support bearing assembly, the wheel support bearing assembly including an outer member having double row outer raceway surfaces in an inner periphery; an inner member having double row inner raceway surfaces confronting the double row outer raceway surfaces and a hub axle; double row rolling elements rollingly accommodated between the outer and inner raceway surfaces; and a wheel mounting flange integrally formed in the inner member, the method comprising:

air cooling or thermally refining at least the inner member having the wheel mounting flange after forging;

applying a shot peening treatment to an inner diameter portion of the hub axle in the inner member; and hardening the respective raceway surfaces of the outer member and the inner member to a predetermined surface hardness.

* * * * *

UNITED STATES PATENT AND TRADEMARK OFFICE
CERTIFICATE OF CORRECTION

| | | |
|---|---|---|
| PATENT NO. | : 7,909,517 B2 | Page 1 of 1 |
| APPLICATION NO. | : 12/068866 | |
| DATED | : March 22, 2011 | |
| INVENTOR(S) | : Hisashi Ohtsuki et al. | |

It is certified that error appears in the above-identified patent and that said Letters Patent is hereby corrected as shown below:

First Page Column 2 (57) Abstract, Line 6 after "more" delete "than".

Signed and Sealed this
Thirteenth Day of September, 2011

David J. Kappos
*Director of the United States Patent and Trademark Office*